United States Patent
Ahnert et al.

(10) Patent No.: US 10,808,741 B2
(45) Date of Patent: Oct. 20, 2020

(54) QUICK-RELEASE CLAMP WITH SECONDARY RETENTION MECHANISM

(71) Applicant: Redshift Sports LLC, Philadelphia, PA (US)

(72) Inventors: Stephen Dewei Ahnert, New York, NY (US); Erik De Brun, Philadelphia, PA (US); Scott David Poff, Philadelphia, PA (US)

(73) Assignee: Redshift Sports, LLC, Philadelphia, PA (US)

( * ) Notice: Subject to any disclaimer, the term of this patent is extended or adjusted under 35 U.S.C. 154(b) by 0 days.

(21) Appl. No.: 14/777,297

(22) PCT Filed: Mar. 17, 2014

(86) PCT No.: PCT/US2014/030458
§ 371 (c)(1),
(2) Date: Sep. 15, 2015

(87) PCT Pub. No.: WO2014/145655
PCT Pub. Date: Sep. 18, 2014

(65) Prior Publication Data
US 2016/0025121 A1    Jan. 28, 2016

Related U.S. Application Data

(60) Provisional application No. 61/792,268, filed on Mar. 15, 2013.

(51) Int. Cl.
*F16B 2/18* (2006.01)
*F16B 7/04* (2006.01)
(Continued)

(52) U.S. Cl.
CPC ............. *F16B 7/04* (2013.01); *B25B 5/08* (2013.01); *B25B 5/082* (2013.01); *B62K 21/125* (2013.01);
(Continued)

(58) Field of Classification Search
USPC ............ 248/222.13, 222.51, 222.52, 222.14, 248/222.11; 403/322.4, 325, 327, 330;
(Continued)

(56) References Cited

U.S. PATENT DOCUMENTS 4,446,644 A   5/1984  Jimenez et al.
4,570,887 A   2/1986  Banister
(Continued)

OTHER PUBLICATIONS

International Search Report and Written Opinion for PCT/US2014/030458.

*Primary Examiner* — Alfred J Wujciak
(74) *Attorney, Agent, or Firm* — Slavitt IP Law

(57) ABSTRACT

A quick-release clamping mechanism secures two objects and rapidly attaches or detaches to secure the objects to one another in a rigid, repeatable manner. The mechanism is formed from two interconnecting contiguous pieces of material, free from hinges or other attachment devices. The first contiguous piece is attached to a first object, and the second contiguous piece is attached to a second object to be secured to the first object. The piece that forms the first profile can be a rail with a male protrusion. The piece that forms the second profile can be a rail with a female cavity that receives the male protrusion. The mechanism also includes a retention channel, a clamp bar, and a tension device that applies tension to the clamp bar to secure the mechanism. A secondary retention mechanism is provided to prevent separation of the components if the primary locking feature is disengaged inadvertently.

10 Claims, 10 Drawing Sheets

(51) Int. Cl.
*B25B 5/08* (2006.01)
*B62K 21/12* (2006.01)

(52) U.S. Cl.
CPC ............ *F16B 2/185* (2013.01); *F16B 7/0433* (2013.01); *B62K 2206/00* (2013.01)

(58) Field of Classification Search
USPC ....... 269/3, 6, 228, 229, 231, 43; 280/288.4; 42/124, 125, 126, 127, 106
See application file for complete search history.

(56) References Cited

U.S. PATENT DOCUMENTS

| | | | |
|---|---|---|---|
| D334,164 S | 3/1993 | Klieber | |
| 5,226,341 A | 7/1993 | Shores | |
| 5,353,663 A | 10/1994 | Samuelson | |
| 5,615,854 A | 4/1997 | Nomura et al. | |
| 5,680,725 A | 10/1997 | Bell | |
| 5,718,134 A | 2/1998 | Chang | |
| 5,787,630 A | 8/1998 | Martel | |
| 6,095,386 A | 8/2000 | Kuo | |
| 6,196,504 B1 | 3/2001 | Lemke | |
| 6,783,040 B2 | 8/2004 | Batchelor | |
| 6,922,934 B1 | 8/2005 | Huan | |
| 7,077,029 B2 | 7/2006 | McColligan et al. | |
| 7,207,237 B2 | 4/2007 | Johnson | |
| 7,213,485 B2 | 5/2007 | Huang | |
| 7,272,904 B2 | 9/2007 | Larue | |
| 7,490,531 B2 | 2/2009 | Chen | |
| 7,562,484 B2 | 7/2009 | Kim | |
| 7,562,485 B2 * | 7/2009 | Newhall | F41G 11/003 42/124 |
| 7,698,967 B2 | 4/2010 | Ording et al. | |
| 7,712,401 B1 | 5/2010 | Greenwald | |
| 7,823,316 B2 | 11/2010 | Storch et al. | |
| 8,172,247 B2 | 5/2012 | Weber et al. | |
| 8,397,421 B2 * | 3/2013 | Ding | F41G 11/003 42/124 |
| 8,646,738 B2 * | 2/2014 | Stoob | F16M 7/00 248/188.4 |
| 8,806,796 B1 * | 8/2014 | Clifton | F41G 11/003 42/127 |
| 2005/0132839 A1 | 6/2005 | Chen | |
| 2010/0000369 A1 | 1/2010 | Cote | |
| 2010/0107467 A1 * | 5/2010 | Samson | F41G 11/003 42/127 |
| 2010/0108841 A1 | 5/2010 | Kronner et al. | |
| 2011/0146128 A1 * | 6/2011 | Haering | F41G 11/003 42/90 |
| 2011/0247255 A1 * | 10/2011 | Ding | F41G 11/003 42/90 |
| 2011/0266321 A1 | 11/2011 | Hsueh | |

\* cited by examiner

QUICK-RELEASE CLAMP WITH SECONDARY RETENTION MECHANISM

CROSS REFERENCE TO RELATED APPLICATION

This application is a National Stage Entry of International Application PCT/US2014/030458, filed on Mar. 17, 2014, which claims benefit of priority of U.S. Provisional Patent Application Ser. No. 61/792,268 filed on Mar. 15, 2013, the entire disclosures of which are incorporated herein by reference.

TECHNICAL FIELD

This technology relates to attachment mechanism systems, devices, and methods. More particularly, the technology relates to quick-release systems, devices, and methods of attaching that provide a rigid locked connection between bicycle components.

BACKGROUND

Clamping mechanisms are used to hold or secure objects tightly together to prevent movement or separation by applying pressure to the objects. For example, inward pressure is often applied to hold the objects together. There is often play or slop in clamping mechanisms resulting in a non-rigid connection between the two objects. The non-rigid connection can lead to instability or rattling, and may affect safety or functionality in situations where the exact relative orientation of the two clamped objects is critical.

Some clamping and securing mechanisms do not position the two objects relative to one another in a repeatable orientation. If the clamp is adjusted to a specific position, it is often difficult or impossible to accurately reproduce the identical clamped position during subsequent reinstallation of the clamp. This unrepeatability can also affect safety or functionality when the relative orientation of the two objects is critical.

In some applications, when a clamp actuator loosens or opens inadvertently during use, it can be disastrous. For example, inadvertent clamp opening or loosening can cause injury to people or property. When there is no secondary retention mechanism which keeps the two objects from completely separating, an inadvertent loosening or failure of the clamp can pose major problems. For many applications, unexpected separation of the two components represents a major safety hazard.

SUMMARY

The quick-release clamping mechanism of the claimed invention secures two objects. The clamping mechanism of the claimed invention can rapidly attach or detach to secure the objects to one another in a rigid, repeatable manner. The quick-release clamping mechanism does not require any specialized tools to effect the connection or disconnection of the mechanism. This is convenient to the user and saves a lot of time and effort.

The quick-release clamping mechanism of the claimed invention is formed from two interconnecting contiguous pieces of material, free from any hinges, or other attachment devices. The first contiguous piece of the clamping mechanism is attached to a first object to be secured, and the second contiguous piece of the clamping mechanism is attached to a second object to be secured to the first object. The contiguous pieces of the clamping mechanism interconnect to form the secure connection.

The quick-release clamping mechanism of the claimed invention has a variety of applications in a wide range of products and industries. Certain specific application examples are described further below. The clamping mechanism provides a rigid connection that is precise and repeatable. The clamping mechanism can be locked in place to secure the attachment of the two objects. A secondary retention mechanism is provided to prevent separation of the components if the primary locking feature is disengaged inadvertently.

The secure connection device of the claimed invention can be a quick-release clamping mechanism. One example embodiment of the secure connection device includes a first rail having a first profile and a second rail having a second profile. The second rail interlocks with the first rail. One contiguous piece that forms the first profile can be visualized as a rail with a male protrusion. The contiguous piece that forms the second profile can be visualized as a rail with a female cavity that receives the male protrusion to form the interconnected secure connection clamping mechanism. The secure connection device also includes a retention channel, a clamp bar, and a tension applying device configured to apply tension to the clamp bar to secure the connection device. The clamp bar engages into the retention channel in some example embodiments.

In some example embodiments of the claimed invention, the clamp bar has a longitudinal axis perpendicular to the first rail and the second rail. Further, the tension applying device is configured for applying tension to the clamp bar. The tension applying device can be a cam lever in some example embodiments. In at least one embodiment, tension is applied to the clamp bar with the tension applying device, thereby squeezing the female rail profile onto the male rail profile, creating a secure, tight fit between the two interlocking rail profiles. Further, the retention channel can be co-axial with the clamp bar and perpendicular to the first rail and the second rail. The tension applying device can also include at least one spring. In some embodiments, the tension applying device is configured for applying tension to the clamp bar parallel to the longitudinal axis of the clamp bar, for example by pulling on or stretching the clamp bar longitudinally with the applied tension.

In some example embodiments, the first profile is a male protrusion and the second profile is a female cavity. For example, in some embodiments, the first rail has a dovetail male profile, the second rail has a female dovetail profile, and the clamp bar engages in the retention channel at a position co-planar with the female dovetail profile of the second rail. The quick-release clamping mechanism of the claimed invention can include any reciprocal rail profiles that interconnect to provide a secure connection. In some example embodiments, the second rail can be a rigid contiguous unit that interconnects to the first rail. The interconnection can be made with any variety of profiles that fit together. In one example, the interconnection can be made by fitting together two dovetail shaped profile pieces, such as a male dovetail profile and a female dovetail profile. In one embodiment, the interconnecting rails fit together in a manner that permits squeezing (e.g., by applying tension) a female rail cavity of one rail onto a male protrusion of another rail. In one example, this squeezing or applying tension can be accomplished by applying tension to a clamp bar. In one embodiment, the clamp bar passes through the male and female rails through a channel.

A method in accordance with the claimed invention can be used to rigidly and securely fasten two solid pieces. One example method includes sliding a first rail on a first solid piece into a second rail on a second solid piece along a sliding axis to create an interlocking connection between the first rail and the second rail. The method also includes deploying a clamp bar into a retention channel in the second rail perpendicular to the sliding axis and contemporaneously interfering with a sliding action of the interlocking connection between the first rail and the second rail along the sliding axis based upon the deployment of the clamp bar in the retention channel. Tension is applied along the axis of the clamp bar within the retention channel the second rail is squeezed onto the first rail to securely fasten the two solid pieces.

One example embodiment of the method of the claimed invention includes a first rail having a first profile and a second rail that is a reciprocally shaped second profile. The second rail interlocks with the first rail. One method of rigidly and securely fastening two solid pieces can include sliding a first rail with a male profile into the second rail that has a female profile to form the interconnected secure connection clamping mechanism. The method can also include deploying the clamp bar into a retention channel by deploying the clamp bar with at least one spring. Additionally, one example of sliding the first rail into the second rail can include sliding a male dovetail profile of the first rail into the female dovetail profile of the second rail to form an interlocking connection securely fastening two solid pieces. Also, deploying the clamp bar can include deploying the clamp bar from within a concave portion of the first rail into the retention channel housed within the second rail. Further, the method can also include applying force to the clamp bar in a direction perpendicular to the axis of the clamp bar while sliding a male rail into a female rail along the sliding axis, applying tension to the clamp bar in a direction co-planar with the-male rail profile of the first rail, and squeezing the female rail profile onto the male rail profile. In one example, applying force to the clamp bar in a direction perpendicular to the axis of the clamp bar can be accomplished with a spring or set of magnets. However, it should be appreciated that any means of applying an energetic impetus can be used. In one embodiment, applying force to the clamp bar in a direction perpendicular to the axis of the clamp bar provides for deployment of the clamp bar into the retention channel at the moment that the clamp bar lines up with the retention channel. In one embodiment, the clamp bar deploys into the retention channel under the energetic impetus as the rails are slid together.

One example embodiment of the claimed invention is quick-release aero handlebars that include a first rail with an extension bar connected to the first rail and a second rail with a handlebar mount connected to the second rail. The second rail interlocks with the first rail. The example quick-release aero handlebars also include a clamp bar configured to deform the first rail and/or the second rail to provide an interlocked quick-release clamp and a retention channel in which the clamp bar extends, where the combination of the clamp bar and the retention channel provides a secondary retention mechanism.

The quick-release aero handlebars can have a first rail that includes a spring-loaded concave portion and a clamp bar that engages into a spring-loaded concave portion against a spring force. The quick-release aero handlebars can also have a second rail that includes a retention channel where the clamp bar deploys from the spring-loaded concave portion of the first rail against a spring force into the retention channel of the second rail. The quick-release aero handlebars can also include a cam lever attached to the clamp bar, where the cam lever provides a tension to the clamp bar to secure an interconnected quick-release clamp.

DETAILED DESCRIPTION

Figure 1:
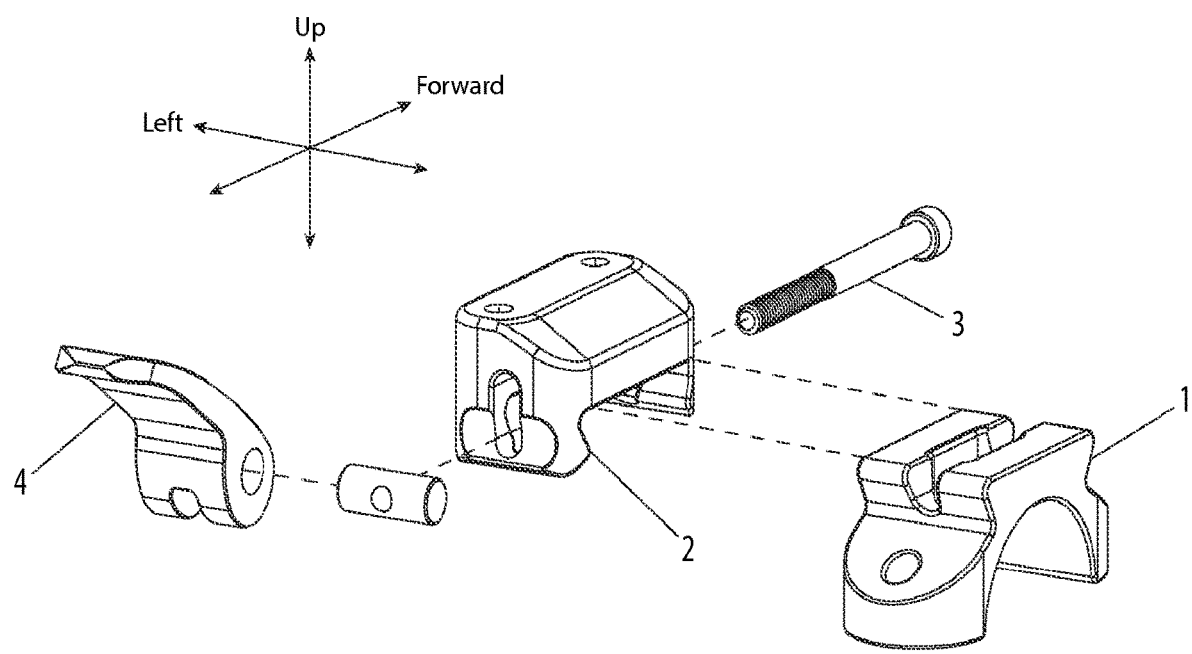
FIG. 1 is an isometric view of the basic components of the quick-release clamp in a disassembled state and shows a reference coordinate system for the descriptions in this patent application.

The claimed invention includes a quick-release clamping mechanism that allows two objects to be rapidly connected or disconnected from one another. The clamp mechanism allows the two objects to be rigidly connected in a repeatable orientation. The clamp includes two primary pieces with interlocking profiles (e.g., male and female) that can slide freely relative to one another in one dimension such that they can be rapidly connected or disconnected. The clamping mechanism provides the ability to repeatedly and rigidly connect two objects in the same relative position in a free sliding direction along the axis of the two interlocking profiles. The clamping mechanism acts on a deformable section of one piece such that the clamping faces of the male and females sections are forced into contact. The clamping mechanism applies sufficient force between these contact faces to immobilize the two halves (pieces) relative to one another, allowing the clamped joint to bear substantial force and/or torque without discernible shifting occurring within the clamping mechanism. The clamping mechanism includes a secondary retention feature which prevents the two halves from separating in the event that the primary clamping force is removed.

An embodiment of the quick-release clamping mechanism is shown in FIG. 1 through FIG. 9. For the purposes of this disclosure, all descriptions utilize the same directional reference frame (up/down, forward/rear, left/right) shown in FIG. 1. However, it is noted that in most cases, the actual orientation of the entire clamping assembly is immaterial. The clamping mechanism functions similarly regardless of overall orientation.

One embodiment of the clamping mechanism includes a male "base" protrusion profile (1) and a matching female "clamp" cavity profile (2). That is, the male protrusion (1) of the first rail has a reciprocal female cavity of the second rail into which the male protrusion slides to form an interconnected secure clamping mechanism. One example embodiment of the claimed invention includes a male protrusion (1) with a dovetail profile, and the female cavity (2) of the second rail has a reciprocal dovetail profile that interconnects with the male protrusion (1) to form the clamping mechanism of the claimed invention. In their un-deformed (i.e., unclamped) states, there is sufficient geometric clearance between the male protrusion and female cavity profiles such that they can slide together smoothly along the axis of the profile into an interlocked orientation. Each of the clamping profiles (1, 2) (male protrusion and female cavity) is constructed of a single solid part, and the combination of the profiles forms the quick-release clamping mechanism. The first contiguous solid piece of the clamping mechanism (e.g., male protrusion (1)) is attached to a first object to be secured, and the second contiguous solid piece of the clamping mechanism (e.g., female cavity (2)) is attached to a second object to be secured to the first object. The contiguous pieces of the clamping mechanism interconnect to form the secure connection. In one example embodiment, the male protrusion base profile (1) is designed and manufactured such that the dovetail clamping surfaces are essentially rigid, whereas the female cavity profile (2) is designed and manufactured with a degree of flexibility, allowing the female cavity dovetail clamping surfaces to be deformed into contact with the matching male protrusion surfaces.

Figure 2:
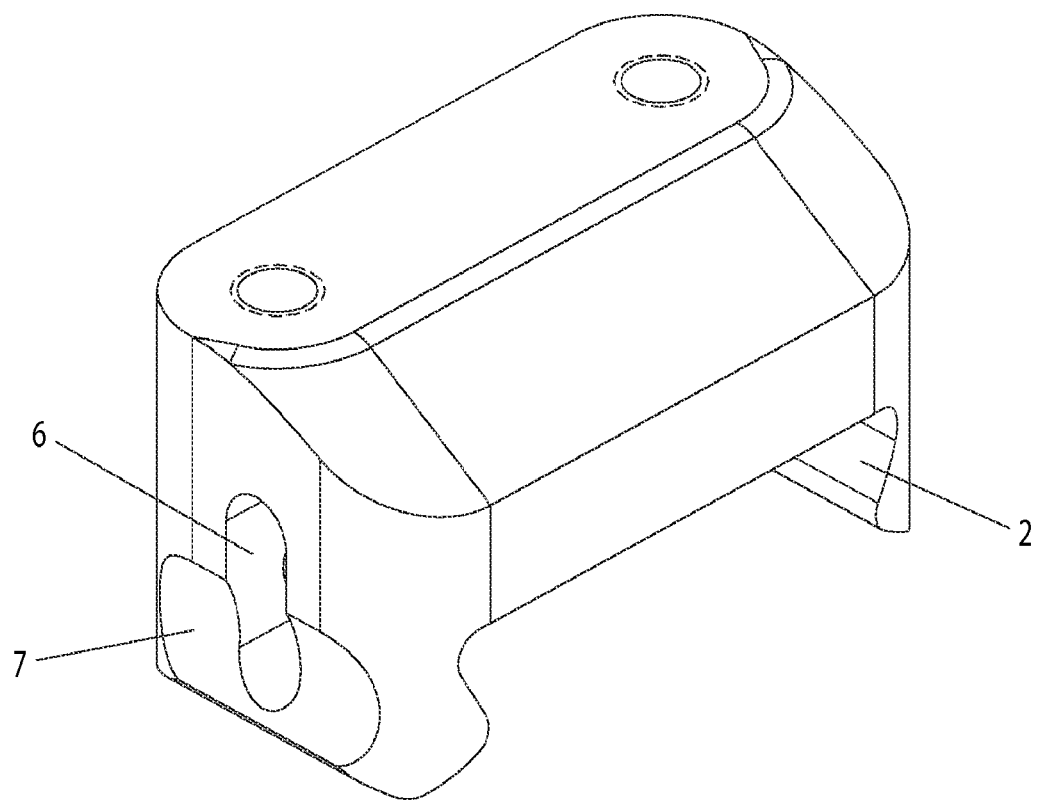
FIG. 2 is an isometric view of an example embodiment of a female clamp piece in accordance with the claimed invention.
Figure 5:
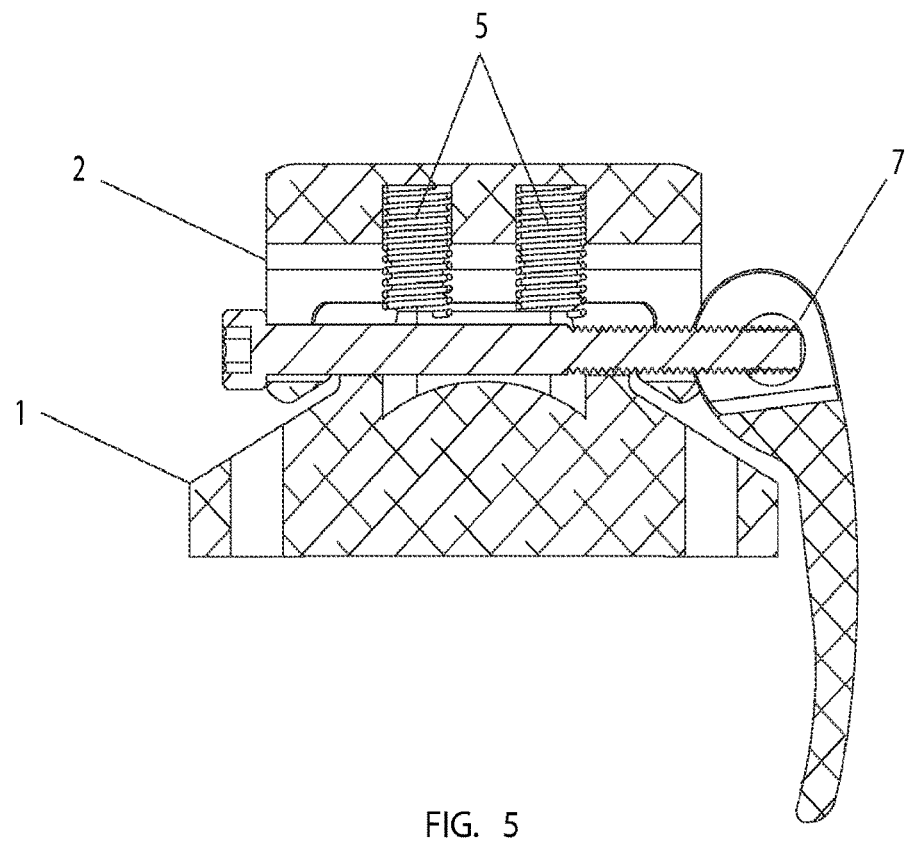
FIG. 5 is a left-side cross-sectional view of an example embodiment of a quick-release clamp assembly in a connected, engaged, and locked position.
Figure 6:
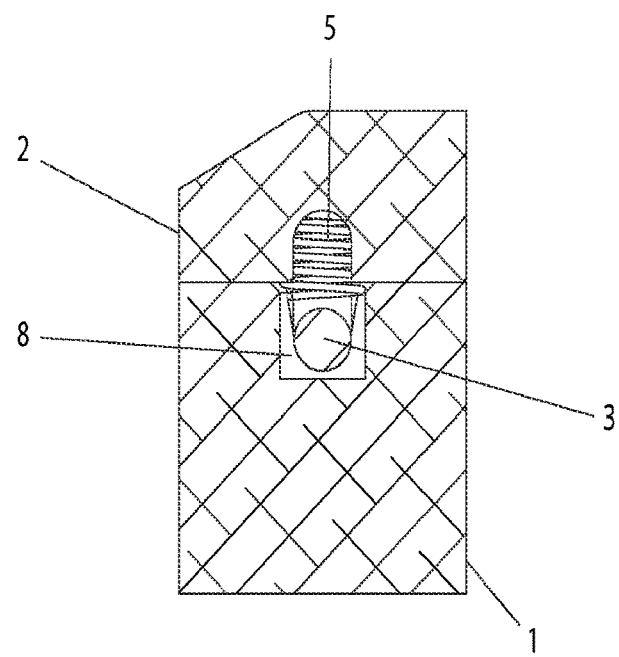
FIG. 6 is a front cross-sectional view of an example embodiment of a quick-release clamp assembly in a connected, engaged, and locked position.

FIG. 2 shows the female cavity clamp (2) profile, including a slot (6) oriented perpendicular to the axis of the dovetail clamp which passes through the entire clamp body. The width of the slot (6) allows a clamp bar (3) (shown in FIG. 1), to slide up and down freely within the slot. The clamp bar (3) can be round or rectangular in profile. The slot length and positioning is chosen so that in its uppermost position, shown in FIG. 8 and FIG. 9, the clamp bar (3) is positioned completely above the dovetail cavity, and in its lowermost position, as shown in FIG. 5 and FIG. 6, the centerline of the clamp bar (3) is below the upper surface of the dovetail cavity in the female cavity clamp (2). In one embodiment, the slot (6) extends downward far enough to position the clamping bar (3) in a location where it is able to flex the female cavity clamp (2) profile effectively. The clamp bar (3) forces repeatable alignment of the profiles along the profile axis, provides a force that deforms at least one of the profiles to create a rigid attachment, and serves a physical barrier as a secondary retention device in keeping the interlocked profiles in place.

Figure 3:
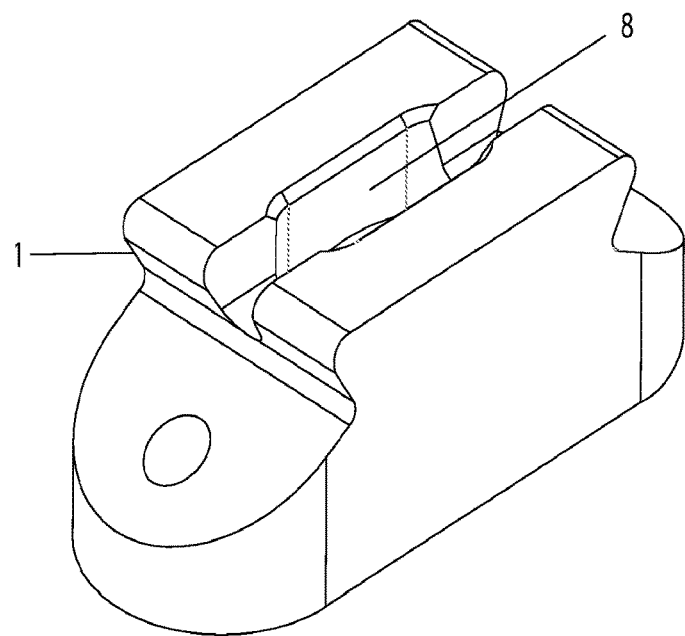
FIG. 3 is an isometric view of an example embodiment of a male clamp piece in accordance with the claimed invention.

FIG. 3 shows the male base protrusion profile (1), which includes a slot (8) across the top of the profile surface perpendicular to the axis of the rail. The width of the slot allows the clamp bar (3) to slide up and down freely within the slot (8). The depth of the slot (8) is such that, when the male protrusion and female cavity (1 and 2) profiles are interlocked, the bottom of the slot (8) on the male profile (1) is approximately coincident with the bottom of the slot (6) on the female profile. The matching slots (6, 8) on the male and female clamp profiles (1, 2) can be positioned at any location along the length of the rail section. If additional clamping force is required (beyond that which can be provided by a single clamping bar), multiple slots with multiple clamping bars (3) can be included in both the male protrusion and female cavity profiles (1, 2).

Figure 10:
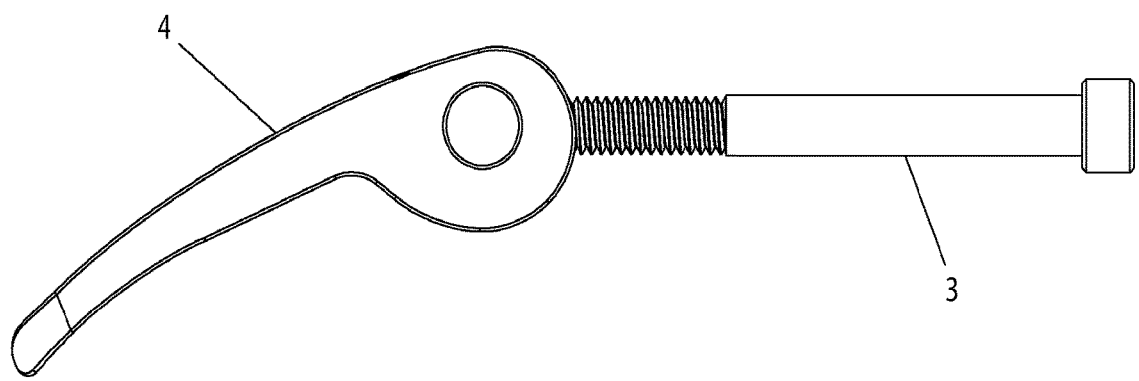
FIG. 10 is a right-side view of an example embodiment of a clamp bar assembly using a bolt as the clamping bar, and a cam lever as the actuator.

In one example embodiment, a clamp bar (3) and cam lever (4) assembly is captured within the slot (6) on the female cavity profile (2). Similar cam lever and clamp bar mechanisms can be used in a variety of applications, including quick-release skewers used to fasten bicycle wheels to bicycle frames. One example embodiment of the cam lever (4) assembly is shown in FIG. 10, although variations of the claimed cam lever assembly can be substituted for the example assembly shown in the figure. When the cam lever (4) assembly is positioned at the bottom of the slot (6), the bearing surfaces on each side of the cam lever (4) assembly rest on matching surfaces on the front and rear of the female cavity profile (2). Rotating the cam lever (4) shortens the effective length of the clamp bar (3), compressing the female cavity profile (2) between the cam lever bearing surfaces and flexing the female profile surfaces into contact with the male profile surfaces on the male protrusion (1). The final clamping force of the cam lever assembly can be adjusted by adjusting the free length of the clamp bar (3). In some example cam lever assemblies, this can be accomplished by using a threaded nut at one end of the clamp bar which allows the effective free length the bar to be finely adjusted.

Figure 4:
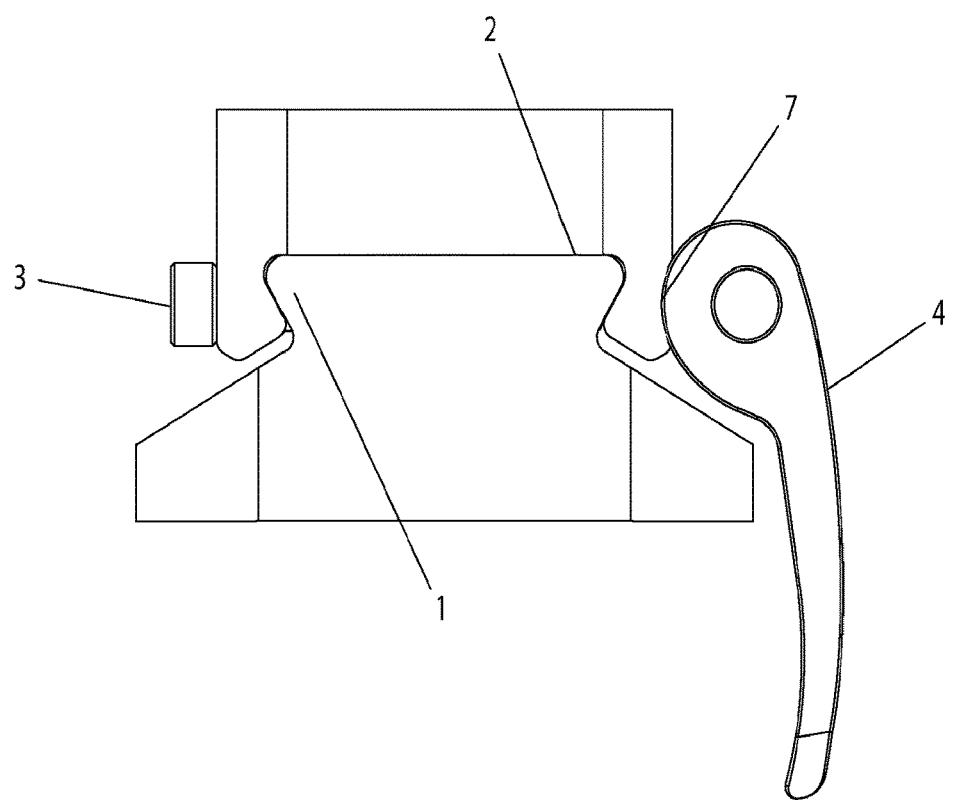
FIG. 4 is a left-side view of an example embodiment of an exemplary quick-release clamp assembly in a connected, engaged, and locked position.

In one example embodiment shown in FIG. 2, the front and/or rear surface of the female cavity (2) clamp includes a cylindrical alignment cutout (7) that matches the outer bearing profile of the cam lever (4). This cutout (7) forces the rotational axis of the cam lever (4) to parallel with the axis of the cutout (7), allowing the orientation of the cam lever (4) to be controlled in the clamped position, as shown in FIG. 4. It also ensures that the cam lever (4) can only be tightened when the clamp bar (3) is at the bottom of the slot (6), ensuring that the clamp bar (3) acts on the deformable section of the female profile (2).

Figure 7:
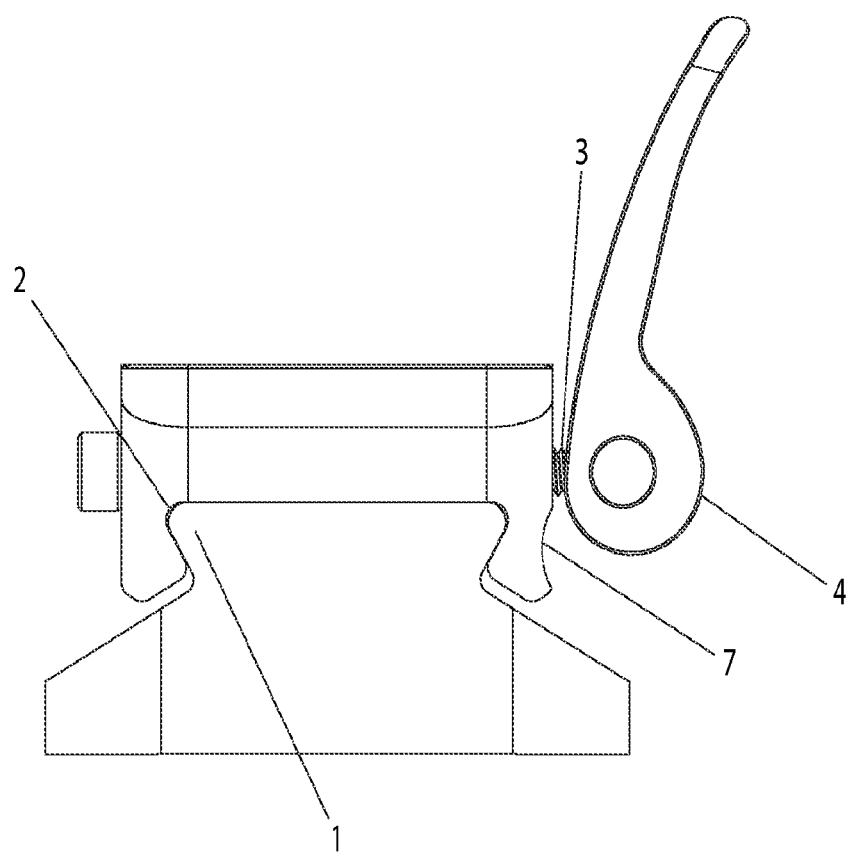
FIG. 7 is a left-side view of an example embodiment of a quick-release clamp assembly in a connected, disengaged, and unlocked position.
Figure 8:
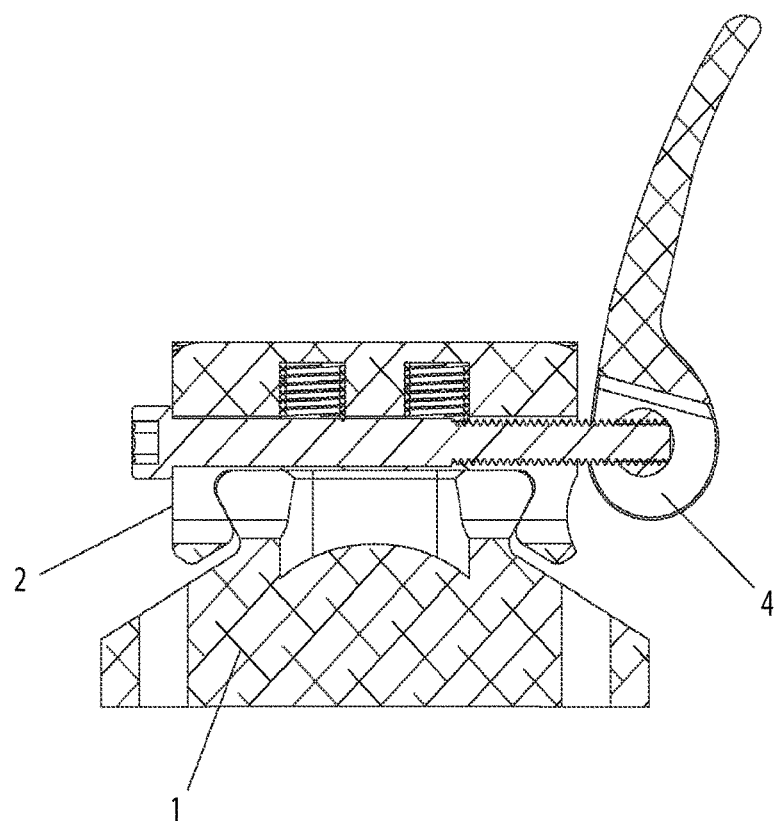
FIG. 8 is a left-side cross-sectional view of an example embodiment of a quick-release clamp assembly in a connected, disengaged, and unlocked position.
Figure 9:
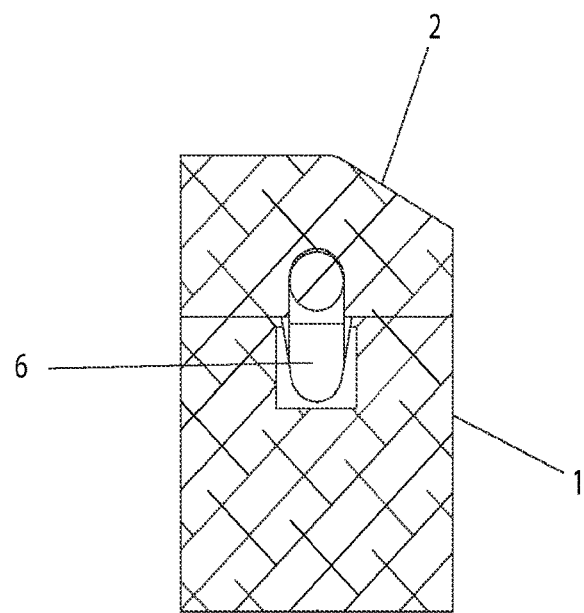
FIG. 9 is a front cross-sectional view of an example embodiment of a quick-release clamp assembly in a connected, disengaged, and unlocked position.

In the normal in-use clamped position shown in FIG. 4 and FIG. 5, the clamp bar (3) passes through the bottom of the slots (6, 8) on both the female and male profiles (2, 1). In this position, the clamp bar (3) serves a secondary retention device and provides a safety function. Regardless of whether the cam lever (4) is tightened, the position of the clamp bar (3) at the bottom of the slot (6) prevents the male (1) and female (2) clamp halves from sliding substantially relative to one another. In order to separate the two sections (male protrusion profile (1) and female cavity profile (2)), the user must lift the clamp bar (3) to the top of the slot (6) on the female cavity half, as shown in FIG. 7 and FIG. 8, which then allows the interlocking rails to slide free of one another. In one example embodiment shown in FIGS. 5 and 6, the clamp bar (3) is spring-loaded (5) toward the engaged (down) position. During installation, the user is required to lift the clamp bar (3) into the disengaged (up) position and slide the female clamp (2) profile onto the male base (1). Once the male and female slots (6, 8) are in alignment, the spring force (5) automatically drives the clamp bar (3) to the bottom of the slot (8) on the male base, preventing any substantial sliding of the male and female halves (1, 2) relative to one another. The spring force (5) allows the clamp bar (3) to remain in the engaged (down) position regardless of the orientation of the assembly. The spring force (5) also ensures that vibration, bumps, or inadvertent transient contact are unlikely to disengage the secondary retention mechanism.

The example embodiment of the clamp assembly shown in FIG. 1 includes provisions (threaded- and through-holes) for attaching the male and female halves (1, 2) to other objects. These example mounting provisions are provided as illustrative examples only, since a huge variety of different attachment methods can be incorporated in accordance with the claimed invention.

Additional Examples

There are a number of alternative example embodiments other than those described above. For example, a rigid male base protrusion section (1) with a flexible female cavity clamp (2) section is described above. In an alternative embodiment, the female section (2) can be designed to be rigid, while the male section (1) can be designed to be flexible. Rather than using a clamp bar (3) to deform the female profile inward, a cam, screw, or other fastening device or mechanism can be used to spread the male profile surfaces outward, forcing them into contact with the rigid female profile surfaces.

Some of the exemplary FIGURES show the profile surfaces as angled planar surfaces with approximately 60° between adjacent surfaces. In an alternative example embodiment, the angle between adjacent surfaces can be between 0-90°. The interlocking surfaces can also be non-planar (e.g., rounded) or include multiple surfaces. Virtually any shape can be utilized for the interlocking surfaces, as long as it allows the male and female sections to interlock securely and restricts the relative motion of the two halves to the axis of the rail profile.

As described above, a cam lever (4) is used to apply tension to the clamp bar (3). In an alternative example embodiment, the clamp bar (3) can be tensioned directly by use of a nut which attaches to a threaded end of the clamp bar (3). Tightening the nut, either by hand or using tools, can replicate the tensioning effect of the cam lever. Similarly, the cam lever (4) can be replaced with a bar-clamp style clamping mechanism, similar to the clamping mechanism found in Irwin® Quick-Grip® clamps.

The use of a cam lever assembly to deform the female profile surfaces (2) into contact with the male profile (1) surfaces is described above. In an alternative example embodiment, the male and female clamp bar slots (6, 8) can be sized such that the clamp bar (3) contacts the bottom of the slot (8) on the male protrusion base prior to contacting the bottom of the slot (6) on the female clamp (2). Given sufficient downward spring-loading (5) of the clamp bar (3), the female clamp body (2) will be forced upward, bringing the profile surfaces into contact. In this manner, the spring loading of the clamp bar (3) alone will serve as the clamping action.

A spring-loaded clamp bar (3) that forces the bar to the bottom of the slot (6) in the female clamp body (2) is described above, but for certain applications, an alternative example embodiment of the clamp eliminates the spring loading and relies on gravity to force the clamp bar (3) to the bottom of the slot (6).

An alternative example embodiment eliminates the clamp bar (3) and cam lever (4) assembly as the manner of applying force. Instead, the female half of the clamp (2) is designed such that the female clamp body (2) is elastically flexed open in order to slide it onto the interlocking rails on the male base (1). Once the female clamp (2) is positioned properly relative to the male base (1), the female clamp (2) is released and reverts back to its un-deformed position, bringing the rails into contact. The clamp bar (3) can be used to align the profiles and to provide a secondary retention mechanism as described above. Similarly, the female clamp body (2) can snap over the male base (1) and be removed by lifting the clamp bar (3) and sliding the female clamp (2) off.

Example Uses and Applications

A. Bicycle Aerobars

Figure 11:
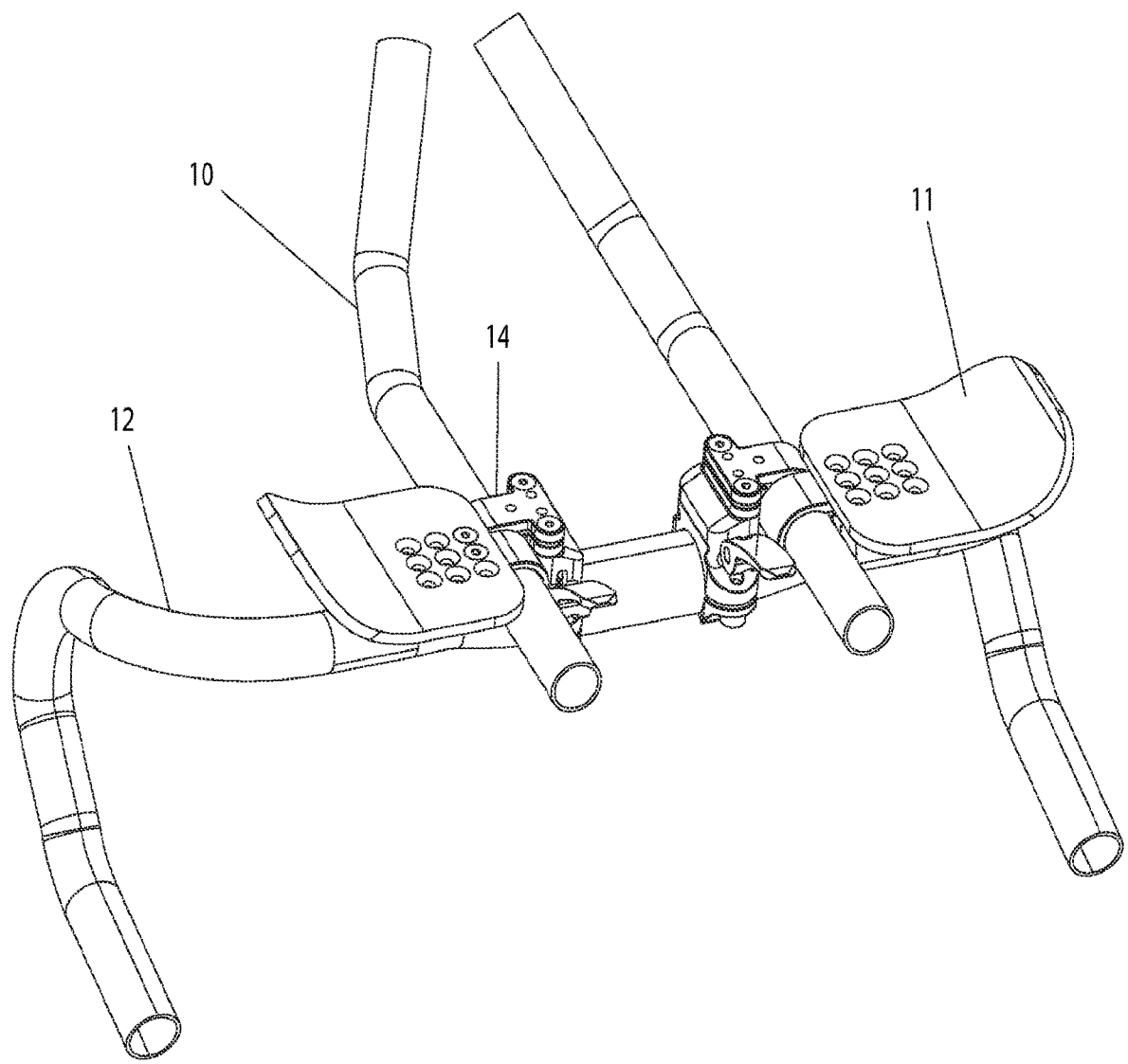
FIG. 11 is an isometric view of an example embodiment of two quick-release clamps in accordance with the claimed invention used to attach a set of aerobars to a bicycle handlebar.
Figure 12:
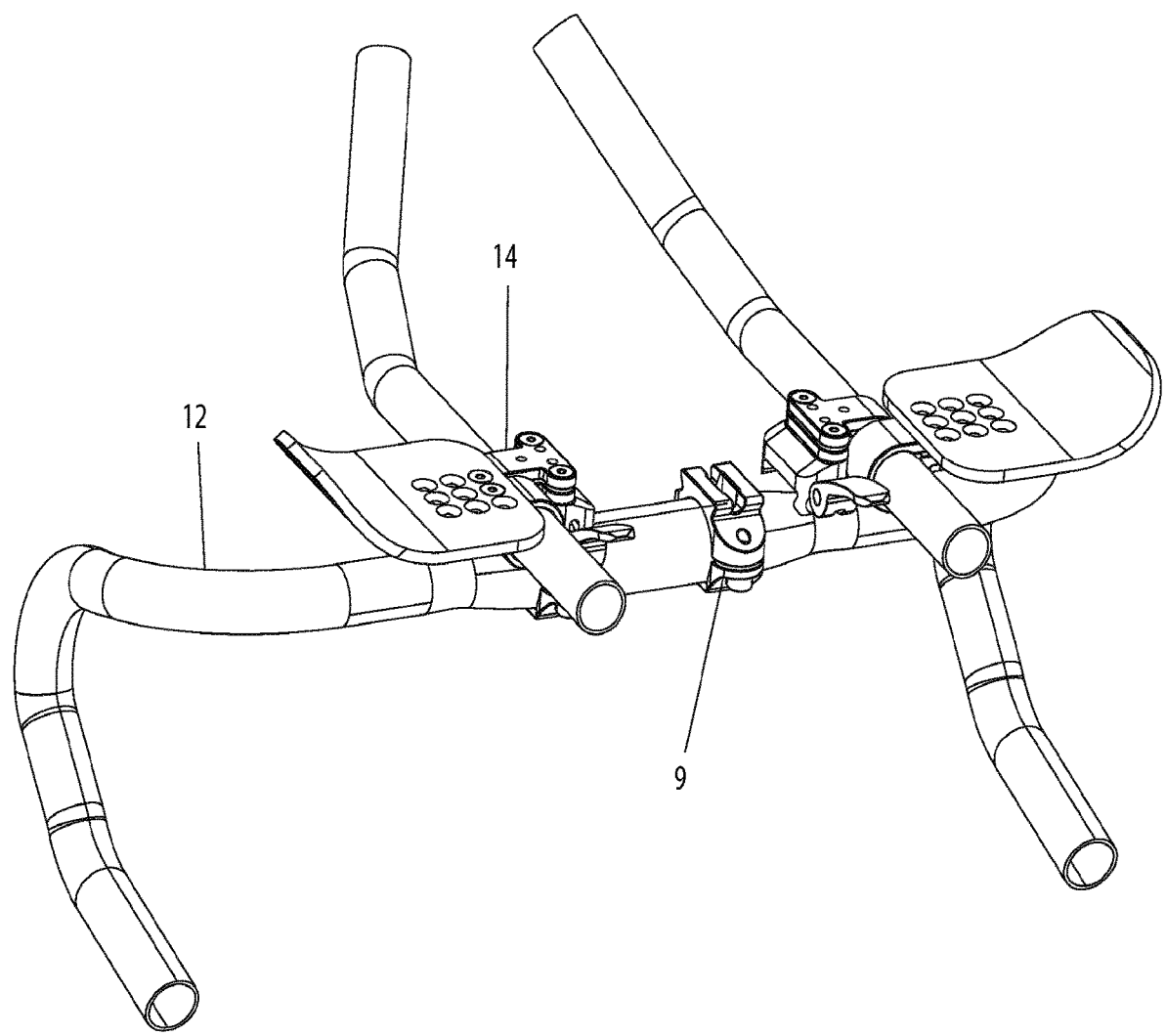
FIG. 12 is a similar isometric view as FIG. 11, with the quick-release clamp on the right-side shown in an unlocked, disengaged, and disconnected from the base section position, where the base section remains attached to the handlebars.
Figure 13:
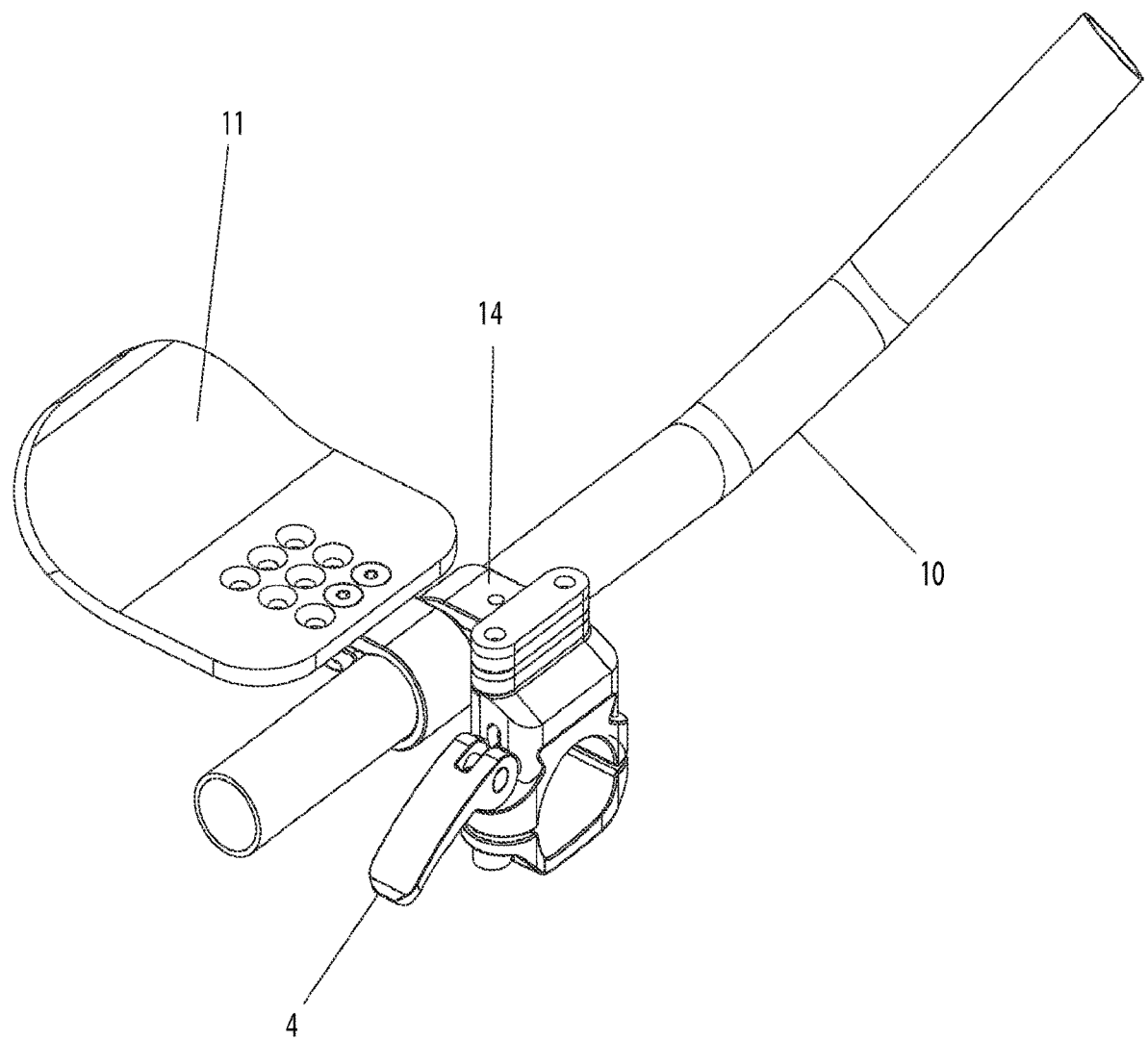
FIG. 13 is an isometric view of a single left-side aerobar assembly removed from a set of bicycle handlebars. In this figure, the quick-release clamp is in the connected, engaged, and locked position.
Figure 14:
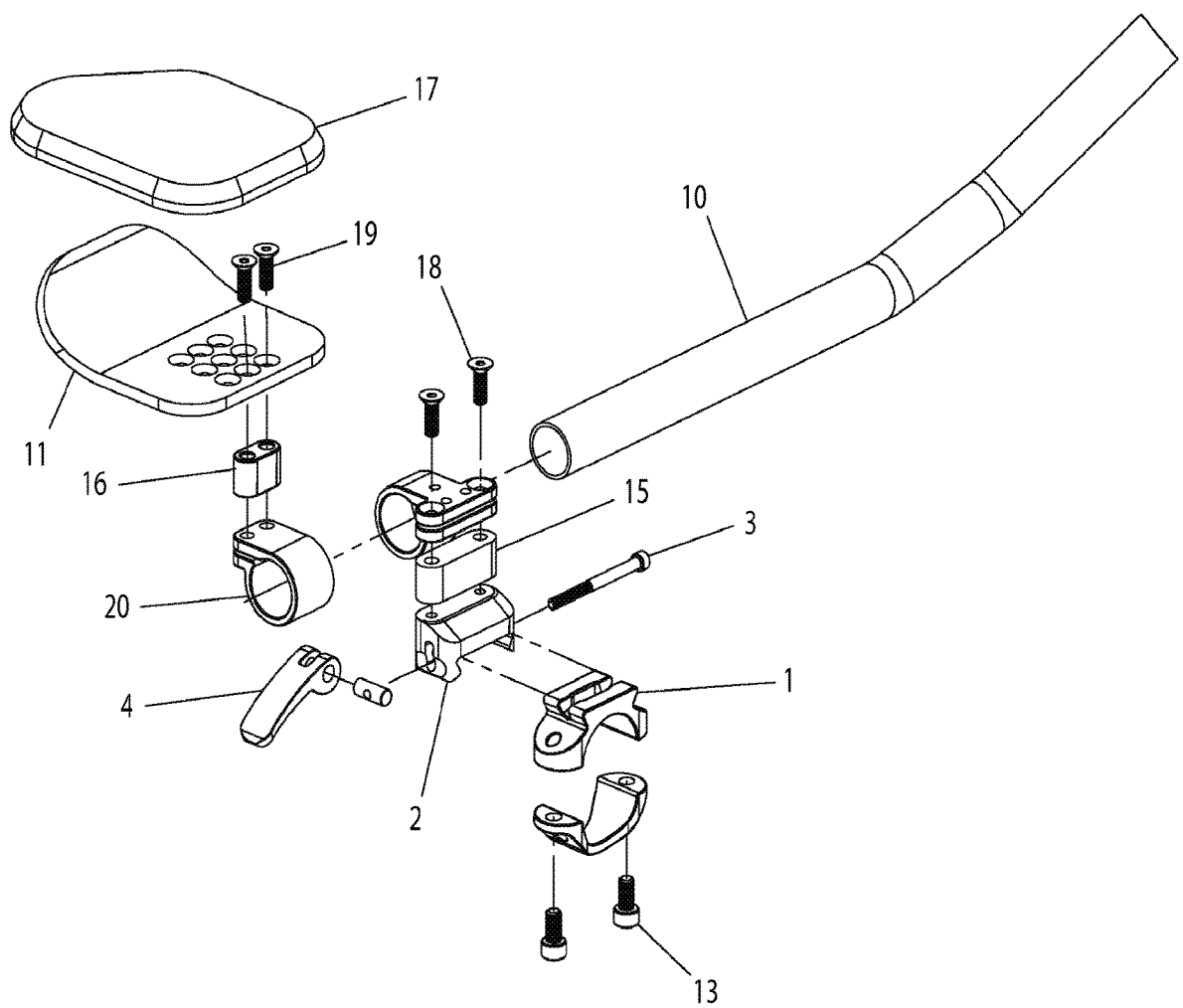
FIG. 14 is an isometric exploded view of a single left-side aerobar assembly, including the handlebar clamp parts with one extension spacer and one armrest spacer shown.

The example embodiment of the clamping mechanism in accordance with the claimed invention above can be used as a quick-release attachment for clip-on aerobars for bicycles, as shown in FIG. 11. Bicycle aerobars are extensions (10) which can be attached to the existing handlebar (12) of a bicycle, allowing a user to ride in a more aerodynamic position. Existing aerobars are generally attached to the bicycle handlebar (12) in a semi-permanent manner using tools, and must be adjusted during each installation. This makes it difficult to quickly install or remove the aerobars and also makes it difficult to install the bars in a repeatable position. The quick-release clamping mechanism described above permits the majority of the aerobar assembly to be rapidly installed and removed from a bicycle handlebar (12). In one example embodiment, the male dovetail base profile (9) is integrated into the top half of a hemispherical compression clamp, as shown in FIG. 11 and FIG. 12. This compression clamp is sized to fit the diameter of the handlebar adjacent to the bicycle stem (not shown), and can be semi-permanently installed using two bolts to clamp the male base profile (9) and female cavity profile (2) (forming hemispheres around the handlebar (12) diameter as shown in FIG. 11 and FIG. 12. The width and pitch of the compression clamp (2, 9) can be adjusted during installation to tune the final position of the aerobar assembly. The male base (9) is intended to remain semi-permanently on the bicycle handlebar (12), but can be readily removed if necessary using tools.

In the example embodiment shown in FIG. 11 through FIG. 14, the female cavity profile (2) is integrated into a base to which the other aerobar parts attach. The top of the female cavity profile (2) includes one or more female threaded holes. The threaded holes serve as anchor points for bolts which are used to secure any number of extension spacers (15) as well as an extension clamp (14). The extension spacers (15) are provided so that the user may adjust the height of the aerobar extension tube (10) relative to the bicycle handlebar (12). The extension clamp (14) is positioned at the top of the spacer (15) stack. Depending on the number of spacers used (or if no spacers are used), different length bolts (18) can be inserted through the holes on the extension clamp and threaded into the female cavity profile (2). Prior to tightening the bolts (18), the user slides the round aerobar extension tube (10) into the extension clamp (14) and positions the extension tube (10) to the desired fore-aft and rotational positions. Tightening the bolts (18) at the top of the extension clamp (14) simultaneously clamps the extension tube (10) in place and secures the extension clamp (14) and extension spacers (15) firmly to the female cavity profile (2).

The extension clamp (14) also includes one or more female threaded holes in the upper surface of the clamp (14). These threaded holes are provided as mounting locations for a variety of accessories that can be attached to the top of the extension clamp via adapters. Examples of such accessories include, but are not limited to water bottle cages, lights, bicycle computers, cameras, phones, storage pouches, speakers, hydration systems, stub handlebar mounts, reflectors, race numbers, bicycle tools, bicycle pumps, $CO_2$ cartridges, bicycle locks, rearview mirrors, sunglass cases or keepers, bells, and the like.

In the example embodiment shown in FIG. 11 through FIG. 14, an armrest clamp (20) is provided which allows an armrest (11) to be attached to the extension tube (10) either in front of or behind the extension clamp (14). The armrest clamp (20) can be a separate physical piece (as shown in FIG. 11 through FIG. 14) or the armrest clamp can be integrated into the extension clamp. In the example embodiment shown in FIG. 11 through FIG. 14, the fore-aft and rotational position of the armrest clamp (20) on the extension tube (10) can be adjusted to tune the armrest (11) position according to the user's preferences. The armrest clamp (20) includes one or more mounting holes which are threaded through the bottom half of the clamp. The armrest base (11) includes a matching hole pattern or a larger hole pattern which allows the armrest base to be placed at various discrete horizontal positions relative to the armrest clamp (20). Any number of armrest spacers (16) may be placed between the armrest clamp (20) and the armrest base (11) to tune the height of the armrest relative to the extension (10). Depending on the number of armrest spacers (16) used (or if no spacers are used), different length bolts (19) may be inserted through the holes on the armrest base (11) and threaded into the armrest clamp (20). Once the position of the armrest (11) is finalized, the user tightens the bolts (19), locking the armrest base (11) and armrest spacers (16) to the armrest clamp (20) and firmly clamping the armrest clamp (20) to the extension tube (10). In one example embodiment, portions of the top of the armrest base (11) are covered with hook-and-loop fabric (not shown). In this example embodiment, an armrest pad (17), which is constructed from a combination of foam and fabric with matching hook and loop fabric on its under side, can be attached to the top of the armrest base (11) to provide cushioning.

In the example embodiment shown in FIG. 12, each side of the aerobar assembly is installed by retracting the spring-loaded clamp bar (3) to its upmost position, then sliding the aerobar assembly laterally onto the male base profile (9). When the aerobar assembly slides into position, the spring-loaded clamp bar (3) automatically snaps into the slot (8) in the male base profile (9). The user then rotates the cam lever (4) by hand into the locking position, forcing the female surfaces into firm contact with the male base profile (9) surfaces and locking the assembly rigidly in place. With the cam lever (4) locked, the aerobar assembly is ready for use. If the cam lever (4) is inadvertently disengaged during use, the aerobar assembly will not be able to slide off the male base profile (9) due to the position of the spring-loaded clamp bar within the slot on the male base profile (9).

The aerobar assembly is removed by first releasing the cam lever (4) and then retracting the clamp bar (3) into the disengaged ("up") position. With the clamp bar (3) retracted, the aerobar assembly can slide laterally off of the male base profile (9) which remains on the handlebars. Because the small male base profile (9) remains semi-permanently installed on the bicycle handlebar, the left and right-hand aerobar assemblies may be rapidly installed and removed without the use of tools. Furthermore, because the male base profile (9) is clamped in a specific fixed orientation relative to the bicycle handlebar (12), the mounted position of the aerobar assembly is repeatable, allowing the user to achieve the same riding position after removal and reinstallation of the aerobar assembly.

B. Other Applications

The rigid quick-release clamp mechanism of the claimed invention has many other potential applications, both in cycling and other sports and industries. In the aerobar embodiment described above, a number of accessories or accessory adapters can be developed that are interchangeable with the aerobar assembly using the same interface. Such accessories include, but are not limited to bike headlights or turn signals, cameras, bike computers, cellular phones, accessory bags or cases (e.g., touring bags or sunglass holders), bells, horns, speakers, water bottles, reflectors, race numbers, tools, tire pumps, $CO_2$ cartridges, bike locks, map cases, tablet computers, other actuators (e.g., suspension lockouts, seatpost height adjustments), baskets, waterproof gear bags/boxes, and the like.

Similar clamping mechanisms can be designed to attach to other sections of the bicycle (e.g., stem, top tube, seat post, frame, etc.) to mount other accessories such as racks, reflectors, fenders, saddle bags, water bottle, locks, pumps, hydration systems, horns, panniers, baskets, trailer bikes, trailers, electric motors, batteries, fishing poles, cameras, cup holders, and the like.

In addition to bicycling applications, the quick-release clamp mechanism of the claimed invention can be applied to any application which requires quick repeatable installation and removal of objects from a base unit.

Examples of such applications include, but are not limited to boats, firearms, motorcycles, automobiles, and the like. In boats, the quick-release clamp can be used for attachment of accessories to rails, masts, and the like as well as for attaching and securing rigging, electronics, fishing poles, solar panels, and the like. On firearms, the quick-release clamp can be used for attachment of scopes, handles, flashlights, laser sights, and the like. On motorcycles, the quick-release can be used for attachment of handlebar-mounted accessories, bags, fenders, and the like. On automobiles, the quick-release clamp can be used for attachment of objects to roof racks, attachment of roof racks to automobiles, and the like.

Materials and Methods

The clamp mechanism and aerobar assembly of the claimed invention described above can be constructed from a variety of different materials. In the embodiments shown, the components can be constructed from materials that provide sufficient structural rigidity for the application. Examples of appropriate materials include (but are not limited to) metals (e.g., aluminum, steel, stainless steel, titanium, magnesium, etc.), plastics (e.g., nylon, glass-filled nylon, acetal, polypropylene, ABS, etc.), wood, composites (e.g., carbon fiber), resins, rubbers, foam, and the like.

Fabrication of the components can be accomplished using a wide variety of established manufacturing techniques including machining, molding, and casting, extruding, forging, laminating, and welding.

We claim:

1. A quick-release bicycle accessory, comprising:

a first rail having a first interlocking profile, a rail profile axis, and an opened channel having a first end and a second end passing through the first rail perpendicular to the rail profile axis;

a second rail having a reciprocally shaped second interlocking profile, a top surface, and a retention channel, wherein the first and second interlocking profiles permit sliding interconnection of the first and second rails along the rail profile axis with the retention channel in the second rail oriented perpendicular to the rail profile axis, wherein the bicycle accessory is connected to the second rail;

a clamp bar having a longitudinal axis perpendicular to the rail profile axis, wherein the clamp bar is sized to slide freely perpendicular to the longitudinal axis of the clamp bar between the first end and the second end of the opened channel in the first rail and, when the first rail and second rail are interconnected, to slide freely perpendicular to the longitudinal axis of the clamp bar between a first position beyond the top surface of the second rail and completely outside the retention channel in the second rail to allow the second rail to slide freely within the first rail and a second position below the top surface of the second rail and within the retention channel in the second rail to lock the second rail within the first rail; and a tension applying device configured to apply tension to the clamp bar to squeeze the first interlocking profile of the first rail onto the second interlocking profile of the second rail when the clamp bar is positioned within the retention channel.

2. The quick-release bicycle accessory of claim 1, wherein the first interlocking profile is a female dovetail cavity and the second interlocking profile is a male dovetail protrusion.

3. The quick-release bicycle accessory of claim 1, wherein the tension applying device is a cam lever attached to the clamp bar.

4. The quick-release bicycle accessory of claim 1, wherein the clamp bar is spring-loaded within a concave portion of the first rail, and wherein the spring applies a force on the clamp bar perpendicular to the axis of the clamp bar so that the clamp bar is forced to the second end of the opened channel in the first rail and, when the first rail and second rail are interconnected, into the retention channel in the second rail.

5. The quick-release bicycle accessory of claim 1 further comprising a handlebar mount.

6. The quick-release bicycle accessory of claim 1 further comprising an extension bar.

7. The quick-release bicycle accessory of claim 6 further comprising a handlebar mount.

8. The quick-release bicycle accessory of claim 7, wherein the first interlocking profile is a female dovetail cavity and the second interlocking profile is a male dovetail protrusion.

9. The quick-release bicycle accessory of claim 7, wherein the tension applying device is a cam lever attached to the clamp bar.

10. The quick-release bicycle accessory of claim 7, wherein the clamp bar is spring-loaded within a concave portion of the first rail, and wherein the spring applies a force on the clamp bar perpendicular to the axis of the clamp bar so that the clamp bar is forced to the second end of the opened channel in the first rail and, when the first rail and second rail are interconnected, into the retention channel in the second rail.

* * * * *